US009550498B2

(12) United States Patent
Meyer et al.

(10) Patent No.: US 9,550,498 B2
(45) Date of Patent: Jan. 24, 2017

(54) TRAFFIC LIGHT ANTICIPATION

(71) Applicant: Ford Global Technologies, LLC, Dearborn, MI (US)

(72) Inventors: Jason Meyer, Canton, MI (US); Jeffrey Allen Doering, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 36 days.

(21) Appl. No.: 14/276,215

(22) Filed: May 13, 2014

(65) Prior Publication Data

US 2015/0329107 A1    Nov. 19, 2015

(51) Int. Cl.
| | | |
|---|---|---|
| *G05D 1/00* | (2006.01) | |
| *B60W 40/04* | (2006.01) | |
| *B60W 30/00* | (2006.01) | |
| *B60W 30/14* | (2006.01) | |
| *G06K 9/00* | (2006.01) | |
| *B60W 30/18* | (2012.01) | |
| *G08G 1/01* | (2006.01) | |
| *G05D 1/02* | (2006.01) | |

(Continued)

(52) U.S. Cl.
CPC .............. *B60W 40/04* (2013.01); *B60W 30/00* (2013.01); *B60W 30/14* (2013.01); *B60W 30/143* (2013.01); *B60W 30/18154* (2013.01); *G05D 1/021* (2013.01); *G06K 9/00791* (2013.01); *G06K 9/00825* (2013.01); *G08G 1/0133* (2013.01); *G08G 1/09623* (2013.01); *G08G 1/166* (2013.01); *B60W 2420/42* (2013.01); *B60W 2550/20* (2013.01); *B60W 2550/22* (2013.01); *B60W 2550/302* (2013.01); *B60W 2550/306* (2013.01); *B60W 2550/308* (2013.01); *B60W 2720/10* (2013.01); *B60W 2720/106* (2013.01)

(58) Field of Classification Search
CPC ........ G08G 1/095; G08G 1/096; G08G 1/166; G08G 1/081; G08G 1/07; G08G 1/082
USPC .................... 701/28, 117, 414, 423
See application file for complete search history.

(56) References Cited

U.S. PATENT DOCUMENTS

| | | | | | |
|---|---|---|---|---|---|
| 3,191,148 | A | * | 6/1965 | Hilliker ................... | G08G 1/08 340/918 |
| 5,330,278 | A | * | 7/1994 | Raswant ................ | G08G 1/082 404/1 |

(Continued)

FOREIGN PATENT DOCUMENTS

| | | |
|---|---|---|
| CN | 103198686 | 7/2013 |
| EP | 2306434 A1 | 4/2011 |

(Continued)

OTHER PUBLICATIONS

GB Search Report for Application No. GB1508109.4 dated Nov. 10, 2015 (1 page).
GB Search Report dated May 31, 2016 (2 pages).

*Primary Examiner* — Khoi Tran
*Assistant Examiner* — Jorge Peche
(74) *Attorney, Agent, or Firm* — Frank A. MacKenzie; Bejin Bieneman PLC

(57) ABSTRACT

A vehicle includes at least one autonomous driving sensor configured to detect a traffic flow pattern relative to an intersection. An autonomous mode controller is configured to determine the state of the traffic control device. The autonomous mode controller may estimate when the state of the traffic control device is likely to change based on the traffic flow pattern.

15 Claims, 2 Drawing Sheets

(51) Int. Cl.
*G08G 1/0962* (2006.01)
*G08G 1/16* (2006.01)

(56) References Cited

U.S. PATENT DOCUMENTS

| | | | | |
|---|---|---|---|---|
| 5,519,390 | A * | 5/1996 | Casini | G08G 1/096 340/925 |
| 6,151,539 | A | 11/2000 | Bergholz et al. | |
| 6,728,623 | B2 | 4/2004 | Takenaga et al. | |
| 7,855,660 | B2 * | 12/2010 | Kim | G08G 1/095 340/907 |
| 8,571,743 | B1 * | 10/2013 | Cullinane | G05D 1/00 701/23 |
| 9,293,043 | B2 * | 3/2016 | Yamada | G08G 1/096716 |
| 2006/0217874 | A1 * | 9/2006 | Ueda | G08G 1/07 701/117 |
| 2007/0069920 | A1 * | 3/2007 | Hakki | G08G 1/0175 340/907 |
| 2008/0071460 | A1 | 3/2008 | Lu | |
| 2008/0218380 | A1 * | 9/2008 | Wall | G08G 1/081 340/907 |
| 2008/0272936 | A1 * | 11/2008 | Kim | G08G 1/095 340/929 |
| 2009/0088966 | A1 * | 4/2009 | Yokoyama | B62D 15/025 701/533 |
| 2009/0146841 | A1 * | 6/2009 | Basson | G08G 1/07 340/925 |
| 2010/0283631 | A1 * | 11/2010 | Bryant | G08G 1/07 340/916 |
| 2010/0305858 | A1 * | 12/2010 | Richardson | G06K 9/00785 701/301 |
| 2011/0037619 | A1 * | 2/2011 | Ginsberg | G08G 1/095 340/910 |
| 2011/0093178 | A1 * | 4/2011 | Yamada | G08G 1/096716 701/70 |
| 2011/0140919 | A1 * | 6/2011 | Hara | B60Q 1/50 340/907 |
| 2011/0148660 | A1 * | 6/2011 | Tate | G08G 1/005 340/906 |
| 2011/0187547 | A1 * | 8/2011 | Kweon | B60K 35/00 340/670 |
| 2012/0140075 | A1 * | 6/2012 | Cunningham | G08G 1/096 348/148 |
| 2012/0223843 | A1 * | 9/2012 | Wall | G08G 1/095 340/944 |
| 2013/0013402 | A1 * | 1/2013 | Tanaka | G08G 1/095 705/14.49 |
| 2013/0110316 | A1 * | 5/2013 | Ogawa | G08G 1/096716 701/1 |
| 2013/0223686 | A1 * | 8/2013 | Shimizu | G08G 1/166 382/103 |
| 2013/0253754 | A1 * | 9/2013 | Ferguson | G05D 1/0231 701/28 |
| 2013/0325241 | A1 | 12/2013 | Lombrozo et al. | |
| 2014/0285331 | A1 * | 9/2014 | Otake | G08G 1/16 340/435 |
| 2014/0314275 | A1 * | 10/2014 | Edmondson | G06K 9/00771 382/103 |
| 2015/0009318 | A1 * | 1/2015 | Peng | B60R 11/04 348/119 |
| 2015/0046055 | A1 * | 2/2015 | Yamada | G08G 1/096716 701/70 |
| 2015/0084791 | A1 * | 3/2015 | Jang | G08G 1/07 340/944 |
| 2015/0375947 | A1 * | 12/2015 | Hochstein | B60Q 9/002 348/143 |
| 2015/0379872 | A1 * | 12/2015 | Al-Qaneei | G08G 1/096783 340/905 |

FOREIGN PATENT DOCUMENTS

| | | | |
|---|---|---|---|
| JP | 55023708 A | * | 2/1980 |
| JP | 2008308025 A | | 12/2008 |
| WO | 2013073014 A1 | | 4/2015 |
| WO | 2015151266 A1 | | 10/2015 |

* cited by examiner

TRAFFIC LIGHT ANTICIPATION

BACKGROUND

Drivers use visual clues to estimate when a traffic light will change color. Some drivers will speed up the vehicle when the traffic light is green to clear the intersection before the light changes to yellow or red. Seeing a traffic light turn yellow prior to reach the intersection will likely cause the driver to slow the vehicle in anticipation of the traffic light turning red. Drivers can use other visual clues from the traffic light, such as a left-turn arrow, to guess when the traffic light will change.

DETAILED DESCRIPTION

An exemplary autonomous vehicle includes at least one autonomous driving sensor configured to detect a traffic flow pattern relative to an intersection. The traffic flow pattern suggests a state of a traffic control device and may include a cross-walk signal, the movement of traffic through an intersection, or the like. An autonomous mode controller is configured to determine the state of the traffic control device. The autonomous mode controller may further estimate when the state of the traffic control device is likely to change based on the traffic flow pattern. By anticipating when the state of the traffic control device is likely to change, the autonomous vehicle may conserve fuel economy, reach a destination in the same or less time than a human driver, drive in a smoother more refined manner or any combination thereof.

The elements shown in the FIGS. may take many different forms and include multiple and/or alternate components and facilities. The exemplary components illustrated are not intended to be limiting. Indeed, additional or alternative components and/or implementations may be used.

Figure 1:
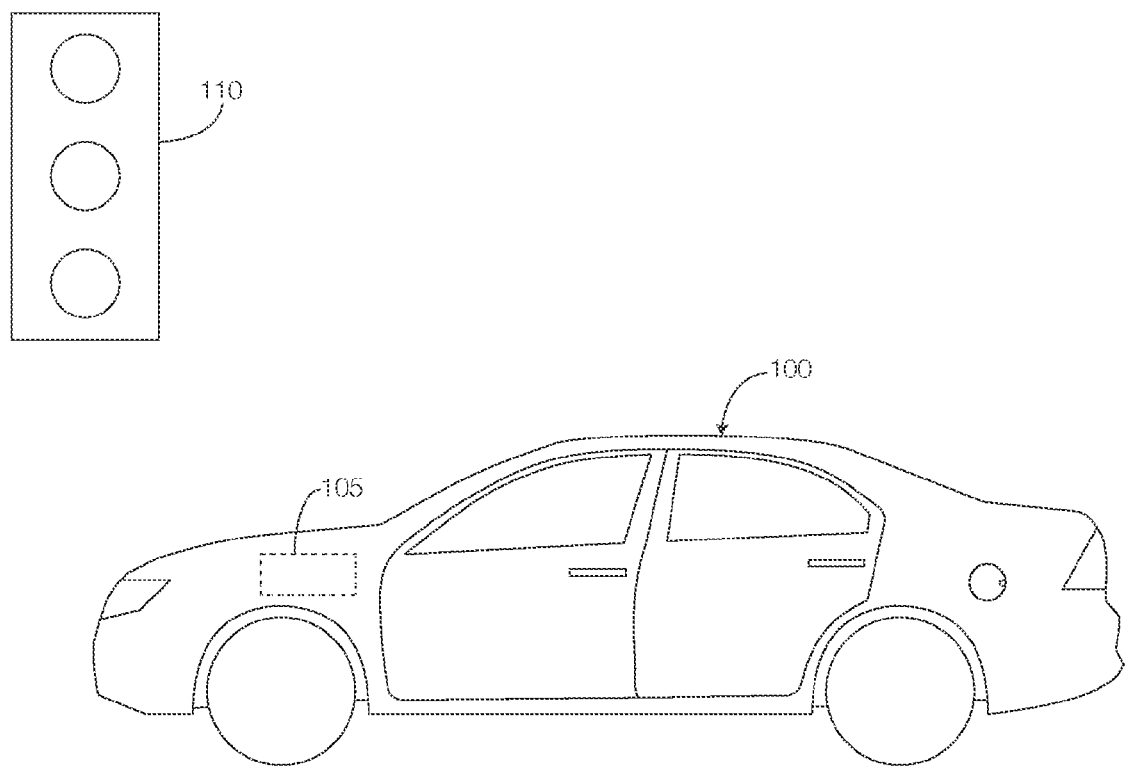
FIG. 1 illustrates an exemplary autonomous vehicle configured to anticipate a change in a traffic light state.

As illustrated in FIG. 1, an autonomous vehicle 100 includes a system 105 configured to anticipate a change of a state of a traffic control device 110. Although illustrated as a sedan, the vehicle 100 may include any passenger or commercial vehicle such as a car, a truck, a sport utility vehicle, a taxi, a bus, etc. In some possible approaches, the vehicle 100 may be configured to operate in an autonomous (e.g., driverless) mode, a partially autonomous mode, a non-autonomous mode.

The traffic control device 110 may be configured to display various signals such as a green light, a red light, and a yellow light. When the green light is displayed, traffic may proceed through the intersection with caution. When the red light is displayed, traffic is not permitted to enter the intersection. When the yellow light is displayed, traffic may proceed through the intersection with caution since the state of the traffic control device 110 will change to display the red light.

As discussed in greater detail below, with reference to FIG. 2, the system 105 is configured to estimate when the state of the traffic control device 110 is likely to change. The system 105 may make such estimations based on traffic flow patterns such as the movement of vehicles through an intersection, a cross-walk signal, or the like. The system 105 may control the operation of the vehicle 100 according to the estimate. For instance, the system 105 may increase the vehicle speed when it is expected that the state of the traffic control device 110 will change from, e.g., a green light to a yellow light before the vehicle 100 reaches the intersection and reduce the vehicle speed when it is expected that the state of the traffic control device 110 will change from, e.g., a green light to a yellow light or red light before the vehicle 100 reaches the intersection.

Figure 2:
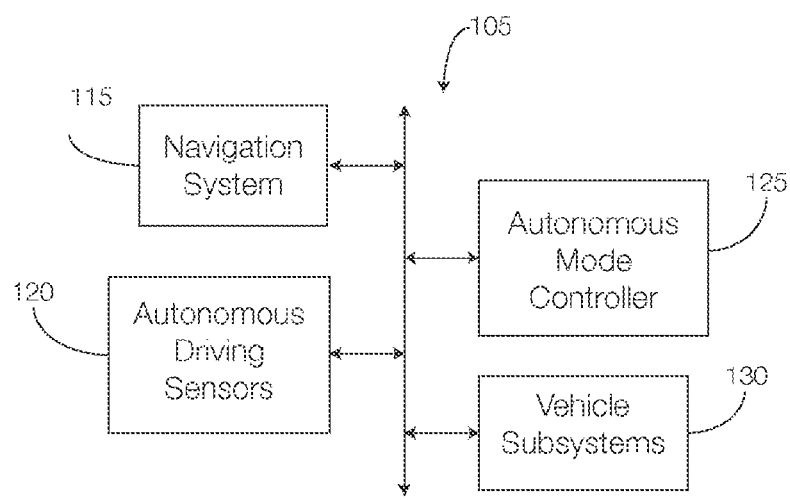
FIG. 2 illustrates an exemplary vehicle system used in the autonomous vehicle of FIG. 1.

Referring now to FIG. 2, the system 105 includes a navigation system 115, at least one autonomous driving sensor 120, and an autonomous mode controller 125.

The navigation system 115 may be configured to determine a position of the vehicle 100, such as a current location of the vehicle 100. The navigation system 115 may include a Global Positioning System (GPS) receiver configured to triangulate the position of the vehicle 100 relative to satellites or terrestrial based transmitter towers. The navigation system 115, therefore, may be configured for wireless communication. The navigation system 115 may be further configured to develop routes from the current location to a selected destination, as well as display a map and present driving directions to the selected destination via, e.g., a user interface device. In some instances, the navigation system 115 may develop the route according to a user preference. Examples of user preferences may include maximizing fuel efficiency, reducing travel time, travelling the shortest distance, or the like.

The autonomous driving sensor 120 may include any number of devices configured to generate signals that help navigate the vehicle 100 while the vehicle 100 is operating in the autonomous (e.g., driverless) mode. Examples of the autonomous driving sensor 120 may include any combination of a radar sensor, a lidar sensor, a vision sensor (e.g., camera), or the like. The autonomous driving sensor 120 may help the vehicle 100 "see" the roadway and the vehicle 100 surroundings and/or negotiate various obstacles while the vehicle 100 is operating in the autonomous mode. Therefore, the autonomous driving sensor 120 may include a camera configured to determine a state of a traffic control device 110. In other words, the autonomous driving sensor 120 may be configured to "see" whether the traffic control device 110 is currently displaying a green light, a red light, or a yellow light. The autonomous driving sensor 120 may be configured to output a signal representing the detected state of the traffic control device 110, or in some instances, a raw image that includes the traffic control device 110 and one or more illuminated lights.

In addition to detecting the traffic control device 110, the autonomous driving sensor 120 may be configured to detect a traffic flow pattern. Detecting the traffic flow pattern may include identifying a cross-walk signal. The cross-walk signal may include a "walk" indicator that the traffic control device 110 is operating in a green light state whereby allowing pedestrian traffic to cross at the intersection in the same direction of travel as the traffic control device 110. Another cross-walk signal may include a "don't walk" signal that indicates that pedestrian traffic may not cross the intersection in the same direction of travel as the traffic control device 110, suggesting that the traffic control device 110 is in the red light state. The cross-walk signal may include a flashing "don't walk" signal that indicates that pedestrian traffic may clear the intersection but should not enter the intersection in the same direction of travel as the traffic control device 110, suggesting that the traffic control device 110 is about to change to the yellow light state, the red light state, or both. Further, the cross-walk signal may include a timer that, e.g., displays the amount of time, in seconds, until the pedestrian traffic will be prohibited from crossing the intersection. This amount of time may further indicate when the traffic control device 110 will change from the green light state to yellow light state, the red light state, or both.

Another type of traffic flow pattern may include vehicle traffic through the intersection. Traffic moving in the same direction as the vehicle 100 through the intersection indicates that the traffic control device 110 is in the green light state. Traffic entering the intersection in the same direction of travel as the vehicle 100 but turning left through the intersection while other traffic in the same direction of travel as the vehicle 100 is stopped at the intersection may suggest that the traffic control device 110 is in a green light state for traffic turning left and in the red light state for traffic through the intersection. Cross-traffic, relative to the vehicle 100, traveling through the intersection may indicate that the light is the red light state for the vehicle 100 and the green light state for cross-traffic.

The autonomous driving sensor 120 may be configured to monitor the traffic flow patterns and output signals indicating whether the traffic flow pattern has changed, which may indicate when the state of the traffic control device 110 may change. For instance, cross-traffic that slowing down as those vehicles near the intersection may suggest that the traffic control device 110 for the vehicle 100 is about to change from the red light state to the green light state. The autonomous driving sensor 120 may output a signal indicating that the state of the traffic control device 110 is about to change or a signal representing the change in the traffic flow pattern. Alternatively or in addition, the autonomous driving sensor 120 may output signals representing the traffic flow pattern, and the autonomous mode controller 125 may interpret the change in the traffic flow pattern based on the change in signals output by the autonomous driving sensor 120, as discussed in greater detail below.

The autonomous mode controller 125 may be configured to control one or more subsystems 130 while the vehicle 100 is operating in the autonomous mode. Examples of subsystems 130 that may be controlled by the autonomous mode controller 125 may include a brake subsystem, a suspension subsystem, a steering subsystem, and a powertrain subsystem. The autonomous mode controller 125 may control any one or more of these subsystems 130 by outputting signals to control units associated with these subsystems 130. The autonomous mode controller 125 may control the subsystems 130 based, at least in part, on signals generated by one or more autonomous driving sensors 120.

The autonomous mode controller 125 may be further configured to determine the state of the traffic control device 110 from signals received from the autonomous driving sensor 120. For instance, the autonomous mode controller 125 may be configured to perform an image processing technique on a raw image captured by the autonomous mode controller 125 to determine the state of the traffic control device 110. With the state of the traffic control device 110 determined, the autonomous mode controller 125 may estimate how long until the state of the traffic control device 110 changes. The autonomous mode controller 125 may use the estimate to control the autonomous operation of the vehicle 100. For instance, if the traffic control device 110 is currently in the green light state but will likely change to the red light state before the vehicle 100 reaches the intersection, the autonomous mode controller 125 may slow the vehicle 100 to increase fuel economy. Alternatively or in addition, if the traffic control device 110 is currently in the green light state but is likely to change to the yellow light state immediately before the vehicle 100 enters the intersection, the autonomous mode controller 125 may speed up the vehicle 100 slightly in order to reach the destination faster without committing a moving violation. In addition or as an alternative to adjusting the speed of the vehicle 100, the autonomous mode controller 125 may adjust the acceleration of the vehicle 100. The autonomous mode controller 125, therefore, may be configured to consider the speed of the vehicle 100 and the distance of the vehicle 100 to the traffic control device 110 when making such determinations. The speed of the vehicle 100 may be determined from any number of sensors (not shown), and the distance may be determined from the navigation system 115, one or more of the autonomous driving sensors 120, or the like.

One way for the autonomous mode controller 125 to estimate when the state of the traffic control device 110 will change may be based on the traffic flow pattern identified by the autonomous driving sensor 120. As discussed above, the traffic flow pattern may include cross-walk signals or signals representing the flow of traffic through the intersection. The autonomous mode controller 125 may process the signals to determine when the state of the traffic flow device may change. For instance, the autonomous mode controller 125 may receive a first signal indicating that cross-traffic is proceeding through the intersection. Thus, the autonomous mode controller 125 may determine that the traffic control device 110 is in the red light state for the vehicle 100. The autonomous mode controller 125 may subsequently receive a second signal indicating that the cross-traffic vehicles are slowing down as they approach the intersection. The autonomous mode controller 125 may determine that the change in the traffic flow pattern suggests that the traffic control device 110 will change to the green light state for traffic in the same direction as the vehicle 100.

As an alternative or in addition to visually detecting when a traffic control device 110 will change state, the autonomous mode controller 125 may rely, at least in part, on data stored in a traffic pattern database. The traffic pattern database may provide information about the traffic control device 110, including how often the traffic control device 110 changes states. For example, the autonomous mode controller 125 may determine that a traffic control device 110 stays in the green light state for two minutes (120 seconds), the yellow light state for three seconds, and the red light state for one minute (60 seconds). If, based on signals output by the autonomous driving sensor 120, the autonomous mode controller 125 determines that the traffic control device 110 has been in the green light state for approximately 110 seconds, the autonomous mode controller 125 may estimate that the traffic control device 110 will change to yellow light state and the red light state within the next 10-15 seconds. The autonomous mode controller 125 can control the vehicle 100 accordingly. Conversely, if the autonomous driving sensor 120 observes that the traffic light has been in the red light state for approximately 55 seconds, the autonomous mode controller 125 may determine that the state of the traffic control device 110 will change to the green light state within approximately 5 seconds and control the vehicle 100 accordingly. The autonomous mode controller 125 may communicate with the traffic pattern database wirelessly over a telecommunications network using any number of telecommunication protocols. Therefore, the vehicle 100 may include a communication module configured to facilitate the wireless communication over the telecommunication protocol.

Figure 3:
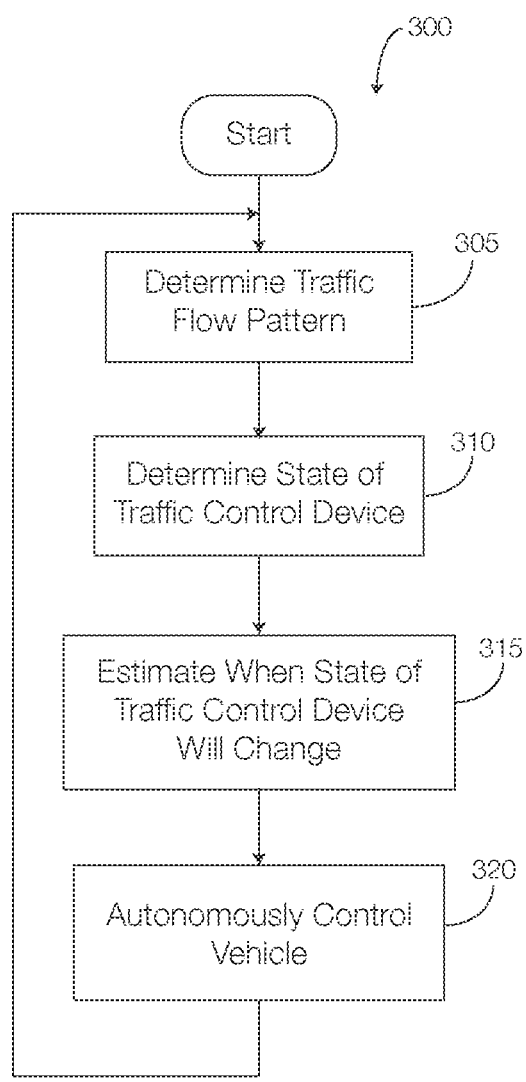
FIG. 3 is a flowchart of an exemplary process that may be used by an autonomous vehicle to anticipate a change in a traffic light state.

FIG. 3 is a flowchart of an exemplary process 300 that may be implemented by the vehicle 100 of FIG. 1. For instance, the process 300 may be executed by the autonomous driving sensor 120, the autonomous mode controller 125, or a combination of both.

At block 305, the autonomous drive sensor may determine a traffic flow pattern for an upcoming intersection. Determining the traffic flow pattern may include detecting a cross-walk signal, traffic flow through the intersection, or the like. In some possible implementations, the autonomous drive sensor may detect and output signals representing the detected traffic flow pattern. The autonomous mode controller 125 may process those signals to determine the traffic flow pattern accordingly.

At block 310, the autonomous mode controller 125 may determine a state of the traffic control device 110. The state of the traffic control device 110 may be determined from, e.g., signals received from the autonomous driving sensor 120. For instance, the autonomous driving sensor 120 may capture an image of the traffic control device 110 and output a signal representing the image. The autonomous mode controller 125 may process the signal and determine whether the traffic control device 110 is in a green light state, a yellow light state, or a red light state.

At block 315, the autonomous mode controller 125 may estimate when the state of the traffic control device 110 will change. For instance, using the cross-walk signal detected by the autonomous driving sensor 120, the autonomous mode controller 125 may determine that the traffic control device 110 is about to change from a green light state to a yellow light state, from a yellow light state to a red light state, or from a red light state to a green light state. The estimate of when the state of the traffic control device 110 will change may be further based on the speed of the vehicle 100, the distance from the vehicle 100 to the traffic control device 110, and possibly other factors.

At block 320, the autonomous mode controller 125 may autonomously control the vehicle 100 according to the estimate of when the state of the traffic control device 110 will change. That is, the autonomous mode controller 125 may increase the speed, acceleration, or both, of the vehicle 100 to, e.g., enter the intersection before the state of the traffic control device 110 changes. Alternatively, if the vehicle 100 is unlikely to reach the intersection before the state of the traffic control device 110 changes, the autonomous mode controller 125 may reduce the speed, acceleration, or both, of the vehicle 100 to, e.g., increase fuel economy. The process 300 may end or continue at block 305 after block 320.

In general, computing systems and/or devices may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle comprising:
   at least one autonomous driving sensor configured to detect a traffic flow pattern indicating a state of a traffic control device, wherein detecting the traffic flow pattern includes identifying a timer incorporated into a cross-walk signal, wherein the timer represents an amount of time until a cross-walk signal will change; and
   an autonomous mode controller configured to estimate, from the timer incorporated into the cross-walk signal, when the state of the traffic control device will change and autonomously control the vehicle based at least in part on the estimate of when the traffic control device will change.

2. The vehicle of claim 1, wherein autonomously controlling the vehicle includes reducing a speed of the vehicle according to the amount of time represented by the timer.

3. The vehicle of claim 1, wherein autonomously controlling the vehicle includes increasing a speed of the vehicle according to the amount of time represented by the timer.

4. The vehicle of claim 1, wherein autonomously controlling the vehicle includes adjusting an acceleration of the vehicle.

5. The vehicle of claim 1, wherein the at least one autonomous sensor includes a camera.

6. The vehicle of claim 1, wherein the autonomous mode controller is configured to determine when the state of the traffic control device will change based at least in part on a speed of the vehicle, a distance from the vehicle to the traffic control device, and the amount of time represented by the timer.

7. A vehicle system comprising:
   at least one autonomous driving sensor configured to detect a timer incorporated into a cross-walk signal associated with an intersection and a state of a traffic control device, wherein the timer represents an amount of time until a cross-walk signal will change; and
   an autonomous mode controller configured to determine the state of the traffic control device, estimate, from the timer incorporated into the cross-walk signal, when the state of the traffic control device will change, and autonomously control the vehicle in accordance with the estimate of when the state of the traffic control device will change.

8. The vehicle system of claim 7, wherein autonomously controlling the vehicle includes reducing a speed of the vehicle based at least in part on the amount of time represented by the timer.

9. The vehicle system of claim 7, wherein autonomously controlling the vehicle includes increasing a speed of the vehicle based at least in part on the amount of time represented by the timer.

10. The vehicle system of claim 7, wherein autonomously controlling the vehicle includes adjusting an acceleration of the vehicle.

11. The vehicle system of claim 7, wherein the at least one autonomous sensor includes a camera.

12. The vehicle system of claim 7, wherein the autonomous mode controller is configured to determine when the state of the traffic control device will change based at least in part on a speed of the vehicle, a distance from the vehicle to the traffic control device, and the amount of time represented by the timer.

13. A method comprising:
   determining a traffic flow pattern relative to an intersection, wherein the traffic flow pattern is based at least in part on a timer incorporated into a cross-walk signal, the timer representing an amount of time until a state of a traffic control device will change;
   determining a present state of the traffic control device;
   estimating, via a computing device, when the state of the traffic control device will change based at least in part on the amount of time represented by the timer incorporated into the cross-walk signal; and
   autonomously controlling a vehicle based at least in part on the estimate of when the state of the traffic control device will change.

14. The method of claim 13, wherein autonomously controlling the vehicle includes reducing or increasing a speed of the vehicle prior to the state of the traffic control device changing and in accordance with the amount of time represented by the timer.

15. The method of claim 13, wherein estimating when the state of the traffic control device will change is based at least in part on a speed of the vehicle, a distance from the vehicle to the traffic control device, and the amount of time represented by the timer.

\* \* \* \* \*